United States Patent [19]

Weidenhaupt et al.

[11] Patent Number: 4,606,392
[45] Date of Patent: Aug. 19, 1986

[54] REINFORCING CORD FOR ELASTOMERIC PRODUCT

[75] Inventors: Wolfgang Weidenhaupt, Erkelenz; Günther Wepner, Waldfeucht-Neuhaaren; Peter Dismon, Heinsberg-Proselen, all of Fed. Rep. of Germany

[73] Assignee: Akzo NV, Arnhem, Netherlands

[21] Appl. No.: 610,878

[22] Filed: May 16, 1984

[30] Foreign Application Priority Data

May 16, 1983 [DE] Fed. Rep. of Germany ....... 3317712

[51] Int. Cl.⁴ .......................... D02G 3/48; B60C 9/00; B60C 15/00
[52] U.S. Cl. ...................................... 152/451; 57/210; 138/124; 152/527; 152/540; 152/556; 198/847; 245/1.5; 474/260
[58] Field of Search .............. 152/359, 354 R, 356 R, 152/361 R, 361 FP, 361 DM, 451, 527, 540, 556, 559–561; 57/215, 213, 212, 902, 210; 245/1.5; 198/957, 847; 474/260; 156/137–142, 143, 144; 138/123–127, 132, 134, 172, 174

[56] References Cited

U.S. PATENT DOCUMENTS 3,402,546  9/1968  Peene ................................ 57/215 X
4,158,946  6/1979  Bourgois ........................ 152/359 X

FOREIGN PATENT DOCUMENTS 225477  6/1924  United Kingdom .

Primary Examiner—Edward Kimlin
Assistant Examiner—Thomas Bokan
Attorney, Agent, or Firm—Michael J. Striker

[57] ABSTRACT

A reinforcing cord for use in radial tires, conveyor belts, hoses or driving belts, includes at least one strand of metal wires twisted along the longitudinal axis of the strand. Each metal wire has a substantially rectangular cross-section defining two opposite broad sides. The wires in the strand engage one another along their broad sides and preferably are wrapped around by a wrapping wire.

23 Claims, 7 Drawing Figures

REINFORCING CORD FOR ELASTOMERIC PRODUCT

BACKGROUND OF THE INVENTION

The invention relates to a reinforcing cord made of at least one strand of metal wires for reinforcing elastomeric products.

Conventional reinforcing cords are assembled of metal wires having circular cross-section. Known also are reinforcing cords assembled of flattened metal wires having approximately rectangular cross-section. For instance, in the British Patent specification No. 225,477 reinforcing having flattened strands of wires is described in which the flatness of the strands and hence of the entire cord is amplified due to the fact that metal wires are employed in the flat strands which engage one another along their flat sides.

SUMMARY OF THE INVENTION

A general object of the present invention is to provide an improved reinforcing cord of the aforedescribed kind which has a more compact construction without through-going capillaries.

Another object of this invention is to provide such an improved reinforcing cord in which the force (stress)-elongation behavior can be adjusted to a desired value in a particuarly simple manner.

A further object of the invention is to provide such an improved reinforcing cord in which variations of diameter along its length are substantially reduced.

An additional object of this invention is to provide a reinforcing cord whose stiffness can be varied. The overall cross-section of the reinforcing cord corresponds substantially to a circle.

In keeping with these objects and others which will become apparent hereafter one feature of the invention results, in a reinforcing cord for use in elastomeric products, in a combination which comprises at least one strand of metal wires, the wires having substantially rectangular cross-section defining opposite broad sides and short narrow sides, and having rounded corners, the metal wires in the strand contacting one another along their broad sides and the strand being twisted about its longitudinal axis.

In the preferred embodiment, the contour of the cross-section of the strand is approximately rectangular and the ratio of its sides is between 2:1 and 1:1.

The contour of the strand is formed by the outer flat surfaces of the metal wires constituting the strand.

Due to the contact of long or broad sides of metal wires in the strand, the reinforcing cord of this invention has a particularly high strength. When the reinforcing cord of this invention is used in an elastomeric product, for example in cord tires of a motor vehicle, then it occupies less space than prior art cords of the same strength. Due to the twist of the reinforcing cord about its center or longitudinal axis the stress-elongation behavior of the cord is rendered more advantageous. At the same time, a uniform, compact cross-section is created over the entire length of the reinforcing cord which reduces the risk of frictional contact with adjoining cords when embodied in an elastomeric product.

In order to facilitate the penetration of the elastomeric material between the embedded cords, it is of advantage when the broad or long sides of the rectangular metal wires have a slightly bulging configuration whereas the narrow sides have a more bulging configuration.

In the case when the reinforcing cord is made of a single metal wire, then the latter has a substantially square cross-section. Preferably, the square cross-section is produced by shaping a round metal wire of a corresponding thickness by drawing through a correspondingly square open die.

When the reinforcing cord is made of a strand of several metal wires then all metal wires have approximately rectangular cross-section with opposite broad sides of the same length. The rectangular cross-section of the metal wires is achieved preferably by flatrolling or by drawing through a drawing die having a correspondingly rectangular cross-section. In the flatrolling process or in drawing round metal wires through the drawing die it is of advantage when no shaping is made in the direction transverse to feeding direction of the wire so that the material is free to flow in this transverse direction. In this manner, the desired strong bulging of the metal sides of the rectangular cross-section is obtained. The rectangular metal wires having the same length of their broad flat sides may, in the same cord, be of different thickness. Nevertheless from the standpoint of manufacturing economy it is of advantage when all wires have approximately the same thickness.

Preferably the ratio of the broad side to the short side of the rectangular cross-section is approximately between 4 and 1.5. For example, if the reinforcing cord of this invention includes a flat metal wire having a ratio of its broad side to its short side of about 1.5 then an additional thin metal wire with a ratio of its width to thickness of about 3 must be added in order to obtain a substantially square cross-section of the cord.

The reinforcing cords of this invention can be manufactured in a simple manner by flatrolling or drawing through a die round wires and simultaneously uniting the flattened metal wires along their broad sides and twisting the united strand about its longitudinal axis. The number of twists per meter, as mentioned before, affects the breaking elongation of the cord.

The twisting of the strand of contacting flat wires or of a single wire of a square cross-section is made preferably by a twisting device arranged between the rolls or drawing die and spool.

A particularly cost saving and simple manufacturing of reinforcing cords of this invention uses alternating twisting in a S and Z direction instead of a continuous twisting in the S or Z direction. The alternating twisting takes place along the entire length of the reinforcing cord. In the preferred embodiments of this invention the reinforcing cord has between 40 and 200 twists per meter.

It has been found that in practice a particular advantageous embodiment of the reinforcing cord of this invention includes two flat metal wires each having a substantially rectangular cross-section of the same size whereby the broad sides of the two wires are in contact with one another and the ratio of the broad side to the short side of individual metal wires is about 2.

As mentioned before, it is also possible to make reinforcing cord according to this invention containing a single metal wire of a square cross-section only or including a strand assembled of 3, 4 or even more metal wires whereby the upper limit of the number of metal wires is determined by the desired stiffness of the cord. The more metal wires are used in the reinforcing cord, the lower is the stiffness of the latter.

For reinforcing cords intended for use in heavy duty truck cord tires for example two or more reinforcing cords of this invention can be united into a reinforcing rope. The before-described reinforcing cords can be classified as a group of simple stranded reinforcing cords. These simple stranded cords can be employed as strands for more complex reinforcing cords whereby the advantages of simply stranded cords are preserved. The complex reinforcing cords made of intertwisting simpler reinforcing cords will be designated in the following description as reinforcing ropes.

A reinforcing rope can be assembled either entirely of reinforcing cords of this invention or the latter can constitute only the core of the rope. In the latter case one or more reinforcing cords are employed as cord strands around which several single wires are layed.

It is of a particular advantage when the number of single wires layed around the cord strand or strands is larger than the number of metal wires in the cord strand having approximately rectangular cross-section.

In a preferred embodiment, reinforcing rope is devised which includes reinforcing cord made of two metal wires of a substantially rectangular cross-section (at a width/length ratio of 2) employed as a cord strand, and 8 single wires of circular cross-section layed around the cord strand. The length of lay of the single wires is preferably 10 to 20 millimeters.

The reinforcing rope is preferably wrapped around with one or more wrapping wires forming a helix around the rope. The helically wound wrapping wires are preferably of a flat cross-section with the broad side contacting the rope wires so that the diameter of the reinforcing rope is reduced. Simultaneously the risk of fretting corrosion between the wrapping wire and the supporting metal wires in a completed elastomeric product is also reduced.

The risk of fretting corrosion is always present when two metallic surfaces are in contact with one another and are loaded so that the contacting surfaces are subject to a minute shifting movement in opposite directions. Such a condition occurs between the metal wires of the reinforcing cord which take up the load of the elastomeric product, and the wrapping wires.

The reinforcing cords and reinforcing ropes of this invention find a useful application particularly in manufacturing pneumatic tires of motor vehicles, heavy duty hoses, conveyor belts or diving belts. They are suitable particularly as cord belts in tires of heavy trucks, load construction machines or tractors.

As known, metal wires employed in reinforcing cords of this invention are made of carbon alloyed steel. Preferably metal wires having 0.6-0.9 percent by weight of carbon are suitable. Tensile strength of such wires produced by drawing and having a circular cross-section, is about 2,500 to 3,500 N/square millimeter. The steel wires must exhibit an excellent bind with the elastomeric material of the product in which they are embedded. For this reason the metal wires are coated with another material such as a plastic material. It is also of advantage when the steel wires are coated with a brass layer.

The novel features which are considered as characteristic for the invention are set forth in particular in the appended claims. The invention itself however both as to its construction and its method of operation together with additional objects and advantages thereof will be best understood from the following description of specific embodiments when read in connection with the accompanying drawing.

DESCRIPTION OF THE PREFERRED EMBODIMENTS

Figure 1:
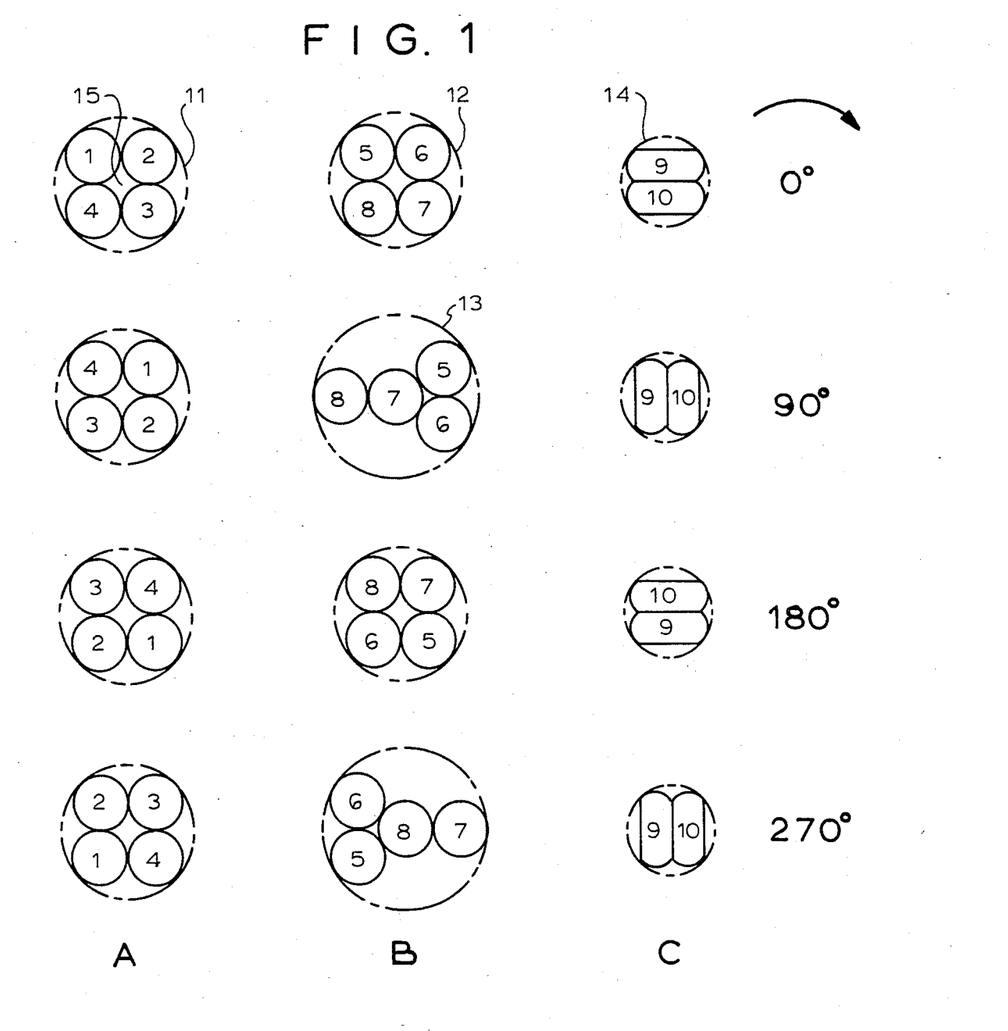
FIG. 1 shows a sectional plan view of four cross-sections of three different reinforcing cords A, B and C, of which cords A and B are prior art reinforcing cords and cord C is the cord according to this invention.

FIG. 1 illustrates three different reinforcing cords A, B and C, of which cords A and B are prior art cords and C is the reinforcing cord according to this invention. Each of the cords A, B and C are shown in cross-sections perpendicular to their longitudinal axis and at different characteristic twisting angles of 0°, 90°, 180° and 270° whereby the selected direction of twisting is indicated by arrow.

Cord A consists of four wires 1, 2, 3 and 4 each having a circular cross-section and being twisted around the longitudinal axis as indicated. Cord B also consists of four wires 5, 6, 7 and 8 of a circular cross-section whereby wires 7 and 8 are parallel wires contacting one another along a straight line and being surrounded by helically wound wrapping wires 5 and 6 which also extend parallel one to another. The reinforcing cord C according to this invention in this embodiment consists of two metal wires 9 and 10 of a substantially rectangular cross-section each having a ratio of 2:1 of its long side to its short side and contacting one another along their long sides and the entire cord being twisted about its longitudinal axis.

It will be seen from FIG. 1 that the prior art cord A can be circumscribed by a peripheral circle 11 of a constant diameter which is larger than that of the corresponding circumscribed circle 14 in the reinforcing cord C according to this invention. It will be also seen that the prior art cord A exhibits a through-going capillary 15 extending along the longitudinal axis of the cord A between the four wires 1, 2, 3 and 4. This central capillary 15 cannot be penetrated by rubber when the cord is embedded in the elastomeric material and consequently in the case of a mechanical damage of the elastomeric material in which the reinforcing cord is embodied, corrosive media are permitted to enter the capillary 15 and propogate to such a extent that a separation of layers may occur.

In contrast, in the reinforcing cord C according to this invention the formation of any capillary between the wires is made impossible and therefore the aforedescribed corrosive affects cannot occur.

In the prior art reinforcing cord B the wrapping wires 5 and 6 continuously change their position relative to the core wires 7 and 8 so that in this known embodiment a through-going capillary passage cannot result and the propagation of corrosive media in embodied cords is also excluded. The disadvantage of this prior art cord however is relatively large diameter of circumscribed circles 12 and 13 which independently from the position of wires 5, 6, 7 and 8 even in the most favorable position is always larger than the corresponding circle 14 in the cord C of this invention. Moreover, in the embedded condition the risk of frictional contact between adjoining layers is considerably larger in the cord B than in the cord C of this invention. By virtue of the particular structure of the cord C the spacing between individual cords embodied in the elastomeric product can be reduced and consequently a higher strength per unitary cross-sectional area of the elastomeric product is obtained.

In embedding reinforcing wires in the elastomeric material it is of importance that all wires in the cord be approximately of the same length in order to achieve planar webs of the binding body. It will be seen that in prior art cords A and B this condition is strongly dependent on stresses acting on the individual wires during twisting. In comparison, in reinforcing cord C of this invention the length of the wires remains substantially the same.

Figure 2:
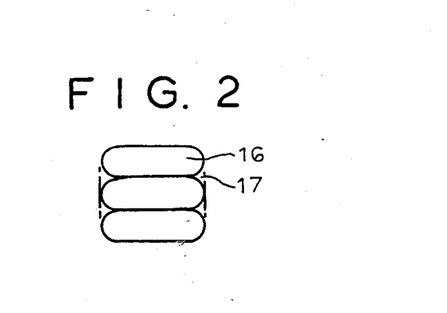
FIG. 2 shows a sectional plan view of another embodiment of the reinforcing cord of this invention.

FIG. 2 shows a cross-section of a cord according to this invention consisting of three superposed flat wires 16 each having a rectangular cross-section whereby the ratio of the broad side to the thickness or to the short side of each wire is about 3. The contour 17 of the cord corresponds substantially to a square with rounded corners.

EXAMPLE 1

Figure 3:
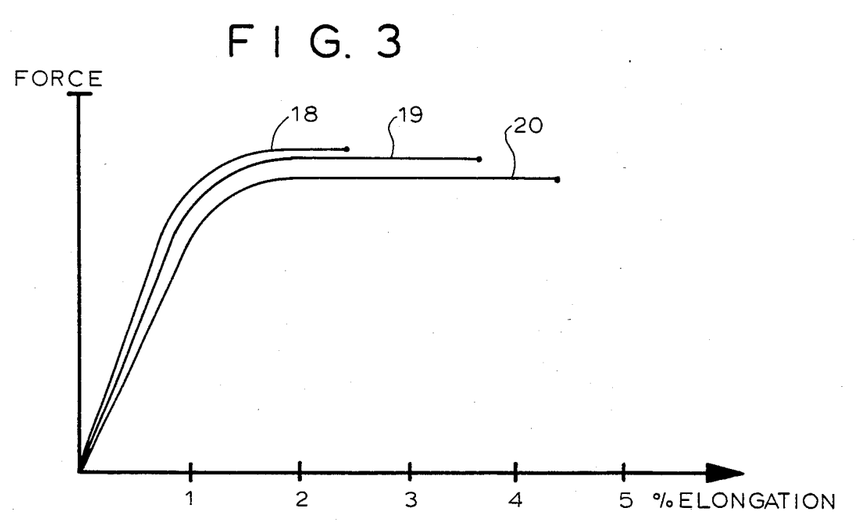
FIG. 3 shows a diagram of force versus elongation of three different reinforcing cords of this invention.

In FIG. 3 there is illustrated a plot diagram of a force-elongation behavior of cords 18, 19 and 20 according to this invention, each consisting of two superposed flat wires of a rectangular cross-section and of equal thickness. The cords differ one from the other by a number of twists per unit length. The results are tabulated in the following Table I.

Figure 4:
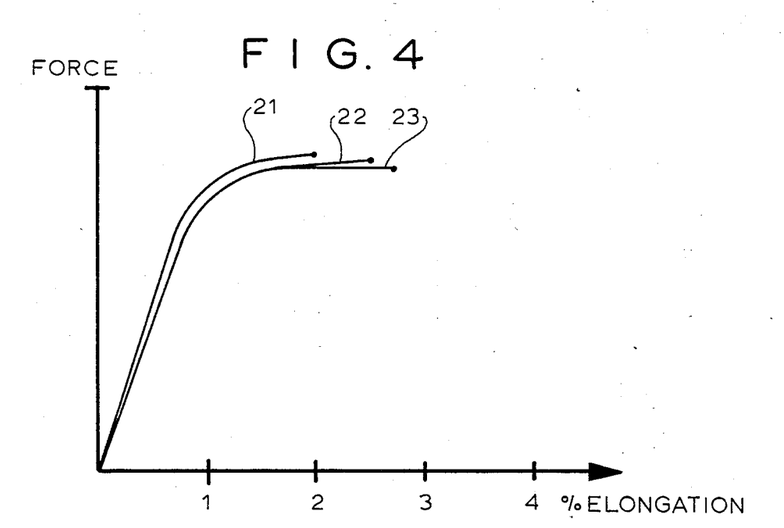
FIG. 4 shows the diagram of force versus elongation of three prior art reinforcing cords.

FIG. 4 shows a similar force-elongation diagram of a prior art reinforcing cord 21–23 each consisting of two steel wires of circular cross-section and each having a different number of twists per meter. The results are also tabulated in the following Table I. The effective cross-section area of cords 18, 19 and 20 according to this invention corresponds to that of prior art cords 21, 22 and 23.

TABLE I

| Cord Nr | Wire Cross-section | Twists per meter | Elongation at $K_{max}$ | $K_{max}$ % |
|---|---|---|---|---|
| 18 | B: H = 2 | 0 | 2.4 | 100 |
| 19 | B: H = 2 | 70 | 3.6 | 97 |
| 20 | B: H = 2 | 100 | 4.4 | 96 |
| 21 | Circular | 0 | 2.0 | 100 |
| 22 | Circular | 70 | 2.5 | 97 |
| 23 | Circular | 100 | 2.7 | 96 |

It is apparent from the plot diagrams of FIGS. 3 and 4 that the elongation of the reinforcing cords according to this invention in response to the applied force can be substantially increased in comparison to prior art cords assembled of round wires whereby the maximum permissible tensile load in both types of cords is comparable and slightly decreases with increasing widths.

EXAMPLE 2

In this example, two prior art commerically available reinforcing cords are compared with a reinforcing cord according to this invention. In the following Table II, cords 24, and 25 correspond to prior art cords A and B in FIG. 2. Reinforcing cord 26 of this invention consists of two superposed flat wires each having an approximately rectangular cross-section with rounded corners. Each of these wires has been produced by flatrolling from a round wire having 0.36 millimeters diameter and being flattened to a thickness of about 0.25 millimeters. The cross-sectional area both of the starting round wires and of the flatrolled finished wires is approximately the same. The specific parameters and properties of the known cords 24 and 25 and of the cord 26 of this invention are tabulated in Table II.

TABLE II

| | Comparison Cord 24 | Comparison Cord 25 | Reinforcing cord of This Invention 26 |
|---|---|---|---|
| Designation of construction | 4 × 0.25 | 2 + 2 × 0.25 | 2 × 0.36 |
| Length of lay mm | 12.5 | 14 | 16 |
| Tensile strength N | 520 | 520 | 523 |
| m-weight ktex | 1.59 | 1.59 | 1.59 |
| Breaking elongation % | 1.87 | 1.79 | 2.55 |
| Average cord diameter mm | 0.6 | 0.66 | 0.57 |
| Bending stiffness SU | 23 | 23 | 36 |
| Permeability to air in vulcanized condition ml/min | 43 | 0 | 0 |

The bending strength has been determined according to BISFA "Internationally agreed methods for testing steel wire cords 1981, Chapter II, Determination of Stiffness."

The air permeability in vulcanized condition provides information about the quality of embedding of a reinforcing cord in rubber. The air permeability has been determined by means of a testing device illustrated in FIG. 5, whereby a testing body according to FIG. 6 has been used.

Figure 6:
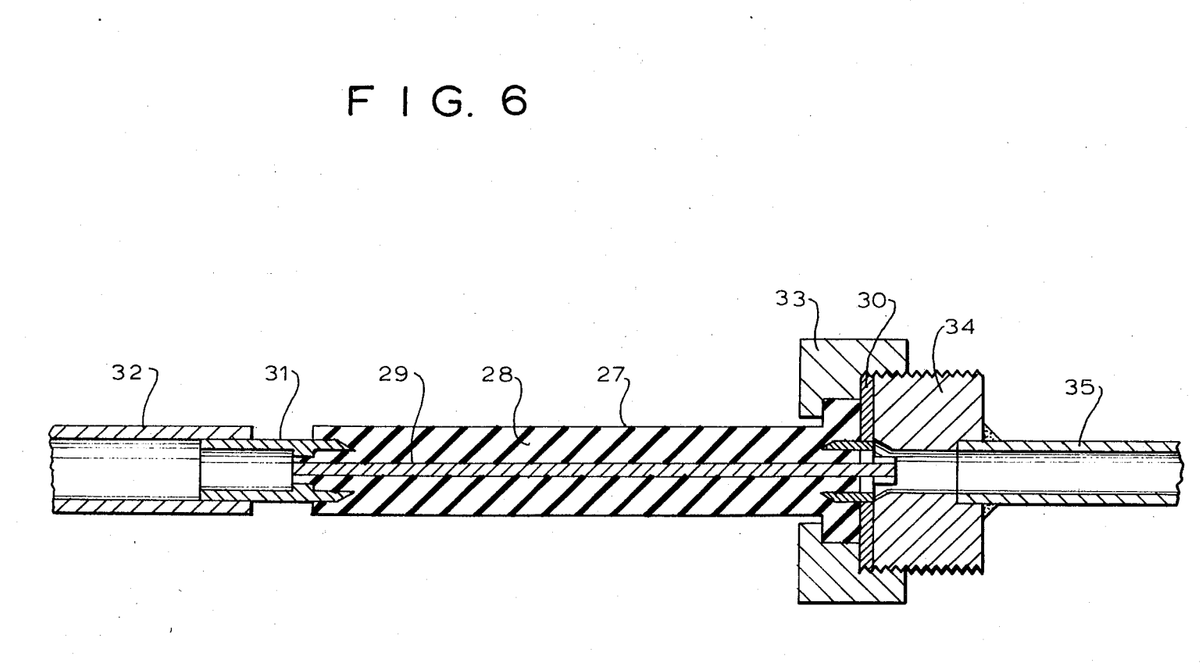
FIG. 6 is a sectional side view of a testing sample for measuring the air permeability of the reinforcing cord.

In order to measure the air permeability, a 7.5 centimeter long piece a reinforcing wire 29 is embedded in rubber 28 whereby the reinforcing cord 29 is visible at both end faces of the testing body 27. Simultaneously a sealing ring 30 and a tubular connection piece 31 are embedded in rubber 28 around opposite ends of the cord.

Figure 5:
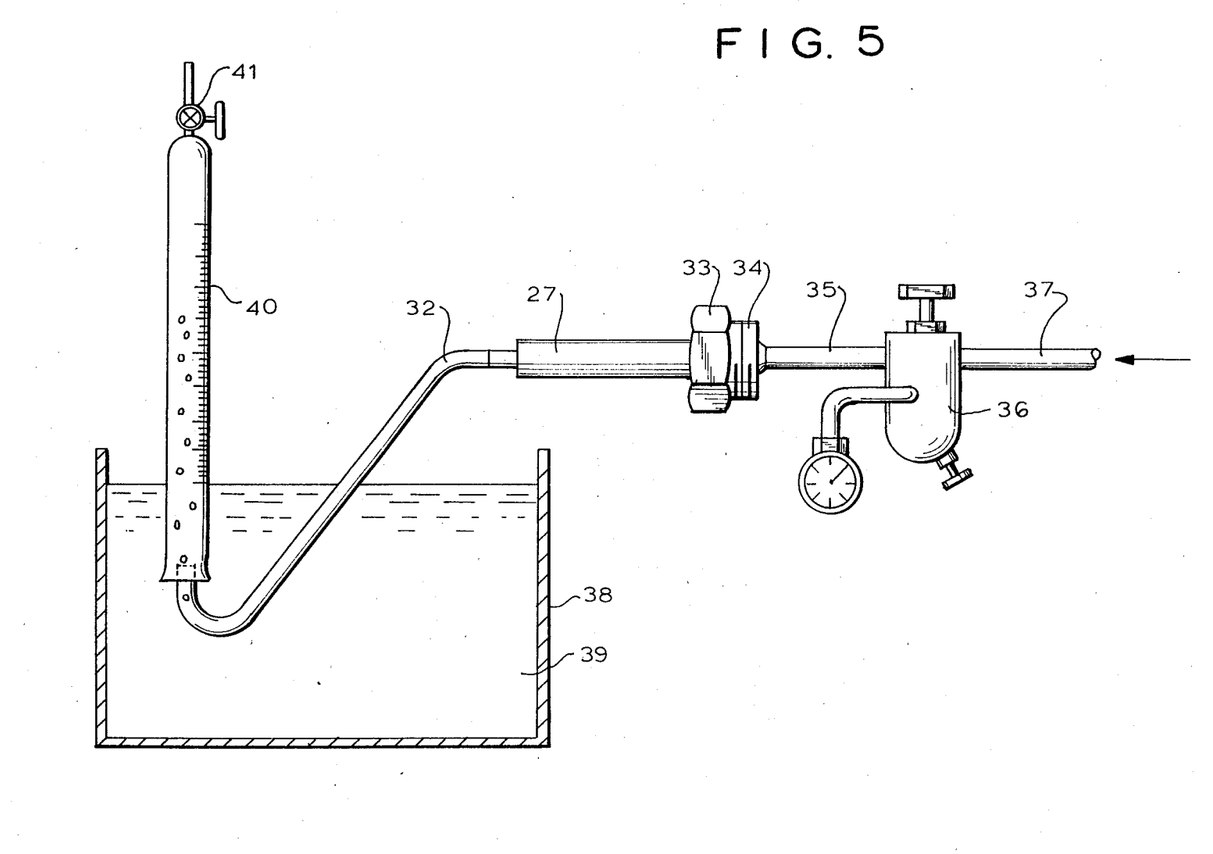
FIG. 5 is a schematic side view of a device for measuring air permeability of a reinforcing cord of this invention embodied in an elastomeric material.

By a union nut 33 the testing body 27 is hermetically connected to a connection piece 34 which is connected via tube 35, a pressure-reducing valve 36 and a pressure-air conduit 37 to a non-illustrated source of pressure air. The opposite tubular connection-piece 31 is connected to a U-shaped tube 32 whose upwardly directed front is immersed in a container 38 filled with water 39. The front of the tube 32 opens into a measuring cylinder 40 provided with graduations.

The cylinder 40 at the beginning of the test is filled with water up to the zero mark and is also immersed into the body of water 39. Valve 41 at the top of the measuring cylinder 40 serves for adjusting the height of the water column in the cylinder.

At the beginning of the measurement of the air permeability a pressure of about 1 bar is adjusted by means of the pressure-reducing valve 36. In the case when air penetrates through test body 27 due to faulty or incomplete embedding of the reinforcing cord 29 in the rubber mass 28, then the resulting air bubbles are assembled in the measuring cylinder 40 and the rate or the amount of air accumulated in the measuring cylinder 40 per time unit, is being measured.

It will be seen from Table II that the reinforcing cord 26 of this invention is substantially more compact in comparison with prior art cords 24 and 25. The average diameter of the cords indicated in Table II serves a measure for compactness. The prior art cords exhibit substantially larger diameter than the cord of this invention (see diameter 13 of Cord B, FIG. 1).

The embedding of the reinforcing cords of this invention in an elastomeric (rubber) product is superior to that of prior art cords as it will be seen from the values of the air permeability in vulcanized condition. The corresponding values can be achieved with prior art cord 25 only by substantially increasing the outer diameter.

The bending stiffness of the reinforcing cord 26 is larger than that of the cords 24 and 25 and consequently the cord of this invention is suited better for the application in cord tires of motor vehicles than conventional cords. In order to facilitate the comparison of the cords in Table II, the tensile strength of all three cords has been set to about 520 N.

It will be also recognized from the Table II that the reinforcing cord 26 of this invention of the same tensile strength has substantially increased breaking elongation in comparison with prior art cords 24 and 25.

EXAMPLE 3

Figure 7:
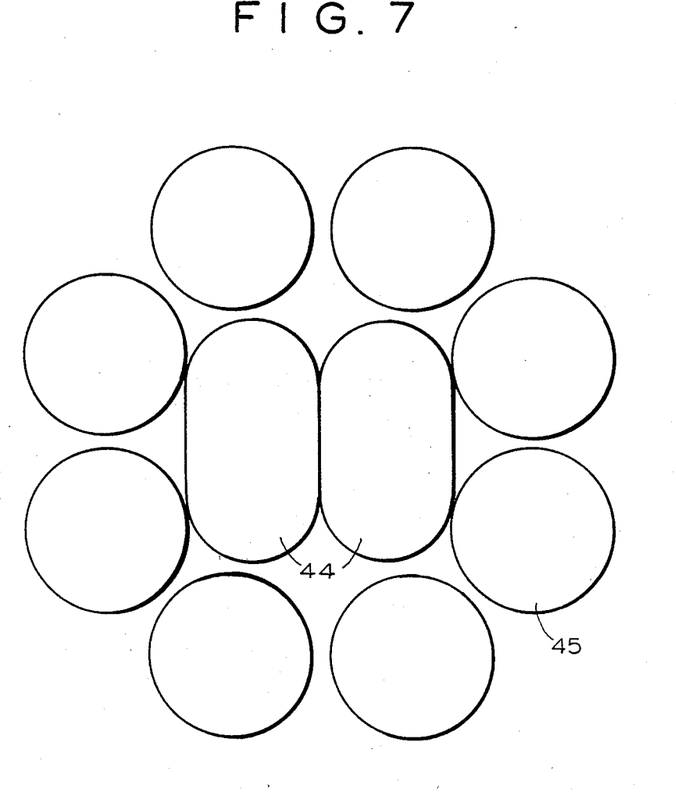
FIG. 7 is a sectional top view of a reinforcing rope according to this invention.

In Example 3 a reinforcing rope 42 includes a core consisting of two superposed flat wires 44 each having a substantially rectangular cross-section with rounded corners, and being twisted around their central or longitudinal axis, is surrounded by eight wires 45 of a circular cross-section, as illustrated in FIG. 7. In the following Table III, the reinforcing rope of this invention is compared with a rope 43 having a core made of three round wires which are surrounded by six round wires wound around the cord. The construction and the properties of the reinforcing rope 42 of this invention and of the prior art rope 43 are shown in Table III.

TABLE III

|  | Reinforcing rope 42 of the invention | Comparative prior art rope |
|---|---|---|
| Designation of construction | 2 × 0.38 F + 8 × 0.30 | 3 × 0.20 + 6 × 0.38 |
| Length of lay mm | 16/16 | 10/18 |
| Tensile strength N | 1762 | 1700 |
| m-weight ktex | 6.13 | 6.14 |
| Breaking elongation % | 2.31 | 2.00 |
| Average cord diameter mm | 1.16 | 1.18 |
| Bending stiffness SU | 161 | 170 |
| Permeability to air in vulcanized condition ml/min | 0 | 25 |

Constructive designation "0.38 F" means that a round steel wire at a diameter of 0.38 millimeters has been flattened by rolling to a thickness of 0.255 millimeters whereby the cross-sectional area of the flattened wire has remained substantially the same.

It will be seen from Table III that in comparison with prior art reinforcing rope 43, the reinforcing rope 42 of this invention has a slightly smaller diameter and a higher tensile strength. In this example a measure of compactness of the rope is tensile strength related to an average diameter of the rope, corresponding in the rope 42 of this invention to the value 1519 N/mm (1762 N:1.16 mm) while in prior art rope 43 the value is 1441 N/mm (1700 N:1.18 mm). It is evident that a reinforcing cord of this invention is substantially more compact than the prior art rope.

The bending strength and the air permeability in vulcanized condition has been determined in the same manner as described in connection with Example 2. The bending strength of the reinforcing cable 42 of this invention is slightly higher than that of the comparison rope 43 whereas the former is superior when embodied in the elastomeric (rubber) material as evident from the test of the permeability to air.

It will be understood that each of the elements described above or two or more together may also find a useful application in other types of construction differing from the types described above.

While the invention has been illustrated and described as embodied in specific examples of the reinforcing cords, it is not intended to be limited to the details shown since various modifications and structural changes may be made without departing in any way from the spirit of the present invention.

Without further analysis the foregoing will so fully reveal the gist of the present invention that others can by applying current knowledge readily adapted for various applications without omitting features that from the standpoint of prior art fairly constitute essential characteristics of the generic or specific aspects of this invention.

What is claimed as new and desired to be protected by Letters Patent is set forth in the appended claims:

1. A reinforcing cord comprising at least one strand of metal wires for reinforcing an elastomeric product, the metal wires having each a substantially rectangular cross-section defining opposite broad and narrow sides and having rounded edges, the metal wires in the strand contacting one another along their broad sides to provide a strand of a substantially rectangular cross-section, the strand being twisted about its longitudinal axis and the ratio of adjoining sides of the strand being between 2:1 and 1:1.

2. A reinforcing cord according to claim 1 wherein the sum of narrow sides of the superposed metal wires equals substantially to the breadth of the broad side.

3. A reinforcing cord as defined in claim 2 wherein each of the metal wires has a substantially the same thickness.

4. A reinforcing cord as defined in claim 1 wherein the strand is continuously twisted along its longitudinal axis in one of the directions S or Z.

5. A reinforcing cord as defined in claim 1 wherein the strand is alternately twisted around its longitudinal axis in direction S and Z.

6. A reinforcing cord as defined in claim 1 wherein the strand includes between 40 and 200 twists per meter.

7. A reinforcing cord according to claim 2 comprising two metal wires of a substantially equal rectangular cross-section, the ratio of the broad side to the narrow side in each wire being 2.

8. A reinforcing rope comprising at least two reinforcing cords according to claim 1.

9. A reinforcing rope as defined in claim 8 wherein at least two reinforcing cords are twisted together.

10. A reinforcing rope comprising a core in the form of a reinforcing cord according to claim 1 and plurality of single wires wrapped around the core.

11. A reinforcing rope comprising a core assembled of a plurality of reinforcing cords according to claim 1 and a plurality of single wires wrapped around the core.

12. A reinforcing rope according to claim 10 wherein the number of single wires wrapped around the core is larger than the number of metal wires in the cord.

13. A reinforcing rope having a center core in the form of a reinforcing cord according to claim 7, and eight single wires wrapped around the center core.

14. A reinforcing rope according to claim 13 wherein the single wires are layed around the core with the length of the twists between 10 to 20 millimeters.

15. A reinforcing rope according to claim 8 comprising at least one wrapping wire wound around the reinforcing cords.

16. A reinforcing rope as defined in claim 10 further comprising at least one wrapping wire wound around the single wires.

17. A reinforcing rope as defined in claim 16 wherein the wrapping wires are flattened.

18. A reinforced elastomeric product such as a pneumatic tire, hose, conveying band or driving belt, in which the reinforcing cord of claim 1, is embedded.

19. A radial tire for motor vehicles having a radial belt in which the reinforcing cord of claim 1 is embedded.

20. A heavy-duty tire for trucks, road construction machines or tractors in which the reinforcing rope according to claim 10 is embedded.

21. A heavy-duty tire as defined in claim 20 having a radial belt in which the reinforcing cord is embedded.

22. A reinforcing cord as defined in claim 1 wherein the broad and narrow sides of the metal wires have, respectively, a convex shape and the radius of curvature of the broad side exceeding that of the narrow side.

23. A reinforcing cord comprising at least one strand of metal wires for reinforcing an elastomeric product, the metal wires having each a substantially rectangular cross-section defining opposite broad and narrow sides and having rounded edges, the metal wires in the strand contacting one another along their broad sides to provide a strand of a substantially uniform compact rectangular cross-section, the strand being twisted about its longitudinal axis, the sum of narrow sides of the superposed metal wires equals substantially to the breath of the broad side and wherein the ratio of the broad side to a narrow side is between 4 and 1.5.

* * * * *